C. B. HITCHCOCK.
Mechanical-Movement.
No. 212,380.  Patented Feb. 18, 1879.
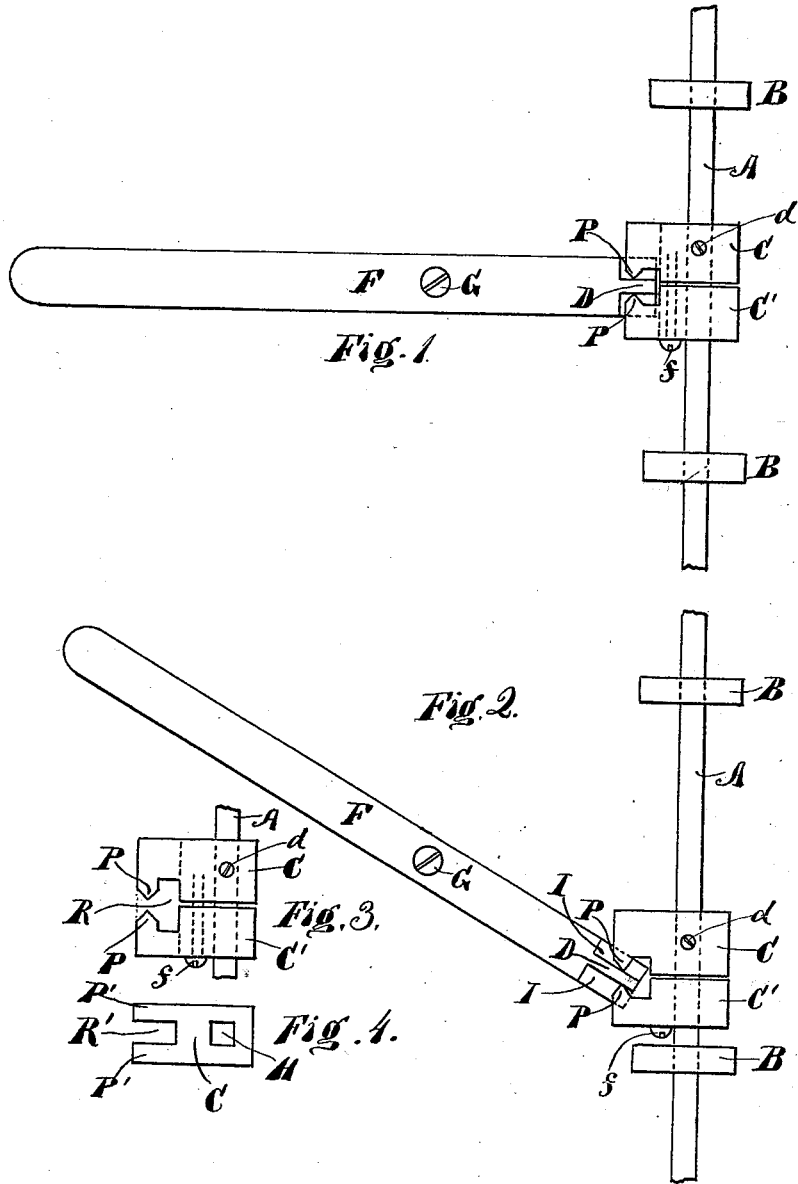

UNITED STATES PATENT OFFICE.

CHARLES B. HITCHCOCK, OF INDIANAPOLIS, INDIANA.

IMPROVEMENT IN MECHANICAL MOVEMENTS.

Specification forming part of Letters Patent No. 212,380, dated February 18, 1879; application filed October 5, 1878.

*To all whom it may concern:*

Be it known that I, CHARLES B. HITCHCOCK, of Indianapolis, in the county of Marion and State of Indiana, have invented a new and useful Mechanical Movement for Transmitting Motion, of which the following is a description, reference being had to the accompanying drawings.

The object of my invention is to provide a device for transmitting motion from one part to another without the possibility of noise resulting from lost motion, even after continued use; also, to make the same adjustable and applicable to moving the needle-bar of sewing-machines; also, to moving the sickle or knife of reaping and mowing machines; also, to the driver of rocker-arms or links of steam-engines; also, from the rocker-arms of the same, to communicate motion to the valve-stem and valves of steam-engines. It is also adapted to be used for any other purpose, when motion is transmitted at right angles from one device to another, where the form or construction may be modified and adapted to the requirements of such cases.

My invention consists of the construction and arrangement of an adjustable clamp attached to the bar, rod, or other objects to be moved, and also the lever for operating the bar, rod, or object, as will be hereinafter fully set forth and described.

In the accompanying drawings, in which like letters of reference in the different figures indicate like parts, Figure 1 represents a side view of my improved adjustable clamp and lever attached to the needle-bar of a sewing-machine, with the bar at half-stroke. Fig. 2 represents the same with the bar at the lowest end of its stroke. Fig. 3 represents a side view of the adjustable clamp detached from the lever, and Fig. 4 is a top view of the clamp detached from the lever and needle-bar.

A represents the needle-bar, operating in the boxes B B.

The clamp is composed of two parts, C C′, which are provided with a mortise or hole, H, for the needle-bar to pass through. The upper part, C, is provided with a set-screw, d, for securing the clamp to the needle-bar, and the lower part, C′, is provided with an adjusting-screw, f, for adjusting the width apart of the pivot-jaws P P, and also of securing the part C′ to the part C.

Each of the parts C C′ of the clamp are provided with an opening or slot, R′, to receive the thin part or rib I I of the lever F; and between the pivot-points P P and the needle-bar A is a cross-slot or opening, R, to allow the side ribs, D, of the lever to operate in between the pivot-points P P, as shown in Figs. 1 and 2.

The lever F is fulcrumed at G, and the ribbed end I I D D is inserted in the slots R R′, so that the ribs D at the sides of the lever shall operate in the space R between the pivot-points P P, and the rib or thin part I I operates in the slot R′, as shown. When the needle-bar is at half-stroke, the lever F and clamp C C′ are in the position shown in Fig. 1, with the pivot-points P P just in contact with the ribs D. As the needle-bar ascends or descends, the ribs D D slide between the pivot-points P P, and the beveled edges of said pivot-points allow the ribs D to tilt either up or down, as shown in Fig. 2.

The points P P are adjusted by means of the adjusting-screw f, so that no lost motion is produced, and all wear on the points P and ribs D can be taken up, and a free and easy motion to the needle-bars given.

What I claim as new, and desire to secure by Letters Patent, is—

1. In a mechanical movement, the pivot-points P P, when used with the bar or rod A or lever F, substantially as shown and described.

2. In combination with the adjustable clamp C C′, having an adjusting-screw, f, and pivot-points P P, the bar or rod A, substantially as set forth and described.

3. In combination with the adjustable clamp C C′, having an adjusting screw, f, and pivot-points P P, the bar or rod A and lever F, having bearing-ribs D D, substantially as shown and described.

4. The clamp composed of the parts C C′, having a space, R′, when each part is provided with pivot-bearings P P, and the parts made adjustable on the bar or rod A by means of the adjusting screw $f$, substantially as shown and described.

5. The ribs I I of the lever F, adapted to operate between the pivot-points P P, and combined with the pivot-points P P, substantially as shown and described.

In testimony whereof I have signed my name to this specification in the presence of two subscribing witnesses.

CHARLES B. HITCHCOCK.

Witnesses:
    E. O. FRINK,
    D. F. SPEES.